(12) United States Patent
Mayr et al.

(10) Patent No.: US 9,081,391 B2
(45) Date of Patent: Jul. 14, 2015

(54) VALVE ASSEMBLY FOR PRESSURE STORAGE VESSEL

(71) Applicant: MAGNA STEYR Fahrzeugtechnik AG & Co KG, Graz (AT)

(72) Inventors: Franz Mayr, St. Marein bei Graz (AT); Armin Scheinost, Bad Gleichenberg (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 22 days.

(21) Appl. No.: 14/070,562

(22) Filed: Nov. 3, 2013

(65) Prior Publication Data

US 2014/0124062 A1    May 8, 2014

(30) Foreign Application Priority Data

Nov. 5, 2012 (EP) .................................... 12191306

(51) Int. Cl.
*F16K 17/00* (2006.01)
*G05D 16/10* (2006.01)
*F16K 17/06* (2006.01)
*F16K 17/26* (2006.01)

(52) U.S. Cl.
CPC .............. *G05D 16/10* (2013.01); *F16K 17/065* (2013.01); *F16K 17/26* (2013.01); *Y10T 137/7779* (2015.04); *Y10T 137/7793* (2015.04); *Y10T 137/7796* (2015.04); *Y10T 137/7808* (2015.04); *Y10T 137/8733* (2015.04)

(58) Field of Classification Search
CPC ............................. F16K 17/18; G05D 16/103
USPC ................. 137/493.7, 493.8, 505.13, 505.25, 137/599.09
See application file for complete search history.

(56) References Cited

U.S. PATENT DOCUMENTS

| 3,709,241 | A | | 1/1973 | McJones | |
|---|---|---|---|---|---|
| 3,890,999 | A | * | 6/1975 | Moskow | 137/505.25 |
| 4,791,957 | A | * | 12/1988 | Ross | 137/505.12 |
| 4,898,205 | A | * | 2/1990 | Ross | 137/505.12 |
| 7,757,710 | B2 | * | 7/2010 | Larsen et al. | 137/505.25 |
| 2002/0088495 | A1 | * | 7/2002 | Semeia | 137/505.25 |
| 2004/0231727 | A1 | | 11/2004 | Nomichi et al. | |

(Continued)

FOREIGN PATENT DOCUMENTS

EP    1 855 048 B1    3/2012

*Primary Examiner* — Kevin Murphy
*Assistant Examiner* — R. K. Arundale
(74) *Attorney, Agent, or Firm* — Jordan IP Law, LLC; Todd A. Vaughn (57) ABSTRACT

A pressure shut-off valve unit for a pressure accumulator vessel. A valve housing has a valve chamber with an accumulator region, an intake opening and an outlet opening facing the pressure accumulator vessel. A piston has at least one axial connecting channel, a first effective piston surface facing an inlet region of the valve chamber and a second effective piston surface adjacent to the accumulator region, the piston being axially movable via a change in pressure of the accumulator region of the valve chamber. Sealing elements are arranged in the valve chamber and which are configured to guide in an axially movable manner the piston. A sealing body of the at least two sealing elements or the valve housing form a valve seat, and a passage opening arranged between the intake opening and the outlet opening is reversibly closed and opened via a change in pressure of the accumulator region of the valve chamber. In a unpressurized state, the passage opening is kept open by at least one spring. The accumulator region of the valve chamber is configured for connection to the inlet region of the valve chamber.

20 Claims, 5 Drawing Sheets (56) References Cited

U.S. PATENT DOCUMENTS

2006/0137745 A1* 6/2006 Carnall .................... 137/505.25
2006/0231142 A1* 10/2006 Schwartz ................. 137/505.25
2006/0278277 A1* 12/2006 Carter ..................... 137/505.25
2009/0242043 A1* 10/2009 Lev et al. ................. 137/505.25

* cited by examiner

VALVE ASSEMBLY FOR PRESSURE STORAGE VESSEL

CROSS-REFERENCE TO RELATED APPLICATIONS

The present application claims priority 35 U.S.C. §119 to European Patent Publication No. EP 12191306.5 (filed on Nov. 5, 2012), which is hereby incorporated by reference in its entirety.

TECHNICAL FIELD

Embodiments relate to a pressure shut-off valve unit for a pressure accumulator vessel for a fluid medium, and to a pressure accumulator system.

BACKGROUND

Pressure shut-off valve units of this type may be used, for example, in the form of individual valves or as valve combinations in the inlet region of tanks or tank systems of motor vehicles in order to prevent overfilling of the pressure accumulator vessel with fuel during a replenishing or filling operation. After the filling operation, the fuel has to be removed again for consumption. Various valve combinations are known for this purpose.

A shut-off valve is known from U.S. Pat. No. 3,709,241. In the case of this valve, a piston is guided in a bore in a valve body in order to limit the filling pressure in a tank. The piston has an elastic sealing element and is pressed against a constricted inlet opening by a spring. Between the bore of the valve body and the piston there is a gap through which gas may pass from the outlet region of the valve into a region of the bore behind the piston, and therefore, the pressure in the outlet region exerts an axial force on the piston and thus supports the spring in the closing of the inlet opening. Gas is thus prevented from flowing from the outlet region back to the inlet opening and at the same time the filling pressure is prevented from exceeding a predetermined value. A removal of gas is not provided with this shut-off valve.

In addition, it is known that a filling pressure of a pressure accumulator vessel or a pressure accumulator system may be controlled and limited by measuring the pressure and by electronic control of electric valves.

European Patent Publication No. EP 1 855 048 B1 discloses a valve arrangement for a gas vessel, the valve arrangement being arranged on the gas vessel, having: a carrying-away line of a gas, which makes it possible for the inside of the gas vessel to communicate with the outside; a first gas line which makes it possible for the inside of the gas vessel to communicate with the outside, and which differs from the carrying-away line; a valve which is on the carrying-away side and which is arranged on the carrying-away line and is configured in such a manner that it blocks the carrying-away line; a first valve which is arranged on the first gas line and is configured in such a manner that it blocks the first gas line; a communication path which connects a section of the carrying-away line outside the gas vessel, as viewed from the valve on the carrying-away side, to a section of the first gas line in the gas vessel, as viewed from the first valve; and a communication shut-off mechanism which opens and closes the communication path, characterized in that the communication shut-off mechanism is configured in such a manner that it opens the communication path, as a result of which the gas accumulated in the gas vessel flows through the first gas line, the communication path and the carrying-away line in this sequence, wherein the first gas line is a filling line which fills the gas vessel with the gas.

European Patent Publication No. EP 1 855 048 B1 is representative of a number of combined valve arrangements which make it possible for fluids to be filled into and removed from pressure accumulator vessels. However, in the applications mentioned, it is desirable for a permissible operating pressure of a pressure accumulator vessel or a pressure accumulator system to be reliably maintained during a filling operation and thus to ensure the maximum operating safety. The filling operation is intended to be able to be carried out as rapidly as possible and with only low energy losses. Wear to valve components is intended to be kept low and damage to pressure accumulator vessels and pressure lines is intended to be prevented. In addition, it is desirable to simplify the pipework of the pressure accumulator systems and to reduce the number and complexity of the pressure lines.

SUMMARY

In accordance with embodiments, enhanced combined valve arrangements of the type mentioned in this respect are provided, and in particular, to specify a pressure shut-off valve unit which is permanently assigned to a pressure accumulator vessel, requires a minimum number of pressure lines and also functions without electric and electronic components.

In accordance with embodiments, enhanced pressure accumulator systems are provided having increased operating reliability.

In accordance with embodiments, a pressure shut-off valve unit for a pressure accumulator vessel for a medium, includes at least one of the following: a valve housing having a valve chamber with an intake opening and an outlet opening facing the pressure accumulator vessel, a movable piston, and at least one biasing mechanism such as, for example, a spring, wherein the piston has at least one axial connecting channel and is guided in an axially movable manner by at least two sealing elements arranged in the valve chamber, wherein a first effective piston surface of the piston, the first effective piston surface facing an inlet region of the valve chamber, and a sealing body or the valve housing form a valve seat, and wherein, by changing the pressure in an accumulator region of the valve chamber, the accumulator region being adjacent to a second effective piston surface, the piston is axially movable and a passage opening arranged between the intake opening and the outlet opening may be reversibly closed and opened, wherein, in the unpressurized state, the passage opening is kept open by the biasing mechanism, and wherein the accumulator region of the valve chamber is arranged so as to be connectable to the inlet region via a removal channel and a removal valve.

In accordance with embodiments, a valve unit for a pressure accumulator includes at least one of the following: a valve housing having a valve chamber with an accumulator region, an intake opening and an outlet opening facing the pressure accumulator vessel; a piston having at least one axial connecting channel, a first effective piston surface facing an inlet region of the valve chamber and a second effective piston surface adjacent to the accumulator region, wherein the piston is axially movable via a change in pressure of the accumulator region of the valve chamber; at least two sealing elements arranged in the valve chamber and which are configured to guide in an axially movable manner the piston; and at least one spring, wherein: a sealing body of the at least two sealing elements or the valve housing form a valve seat, a passage opening arranged between the intake opening and the outlet opening is reversibly closed and opened via a change in pressure of the accumulator region of the valve chamber, and in a unpressurized state, the passage opening is kept open by the at least one spring, and the accumulator region of the valve chamber is configured for connection to the inlet region of the valve chamber.

In accordance with embodiments, a pressure accumulator system includes at least one of the following: a pressure accumulator vessel; and a pressure shut-off valve unit which is operatively connected to the pressure accumulator vessel, the pressure shut-off valve unit including a valve housing having a valve chamber with an accumulator region, an intake opening and an outlet opening facing the pressure accumulator vessel; a piston having at least one axial connecting channel, a first effective piston surface facing an inlet region of the valve chamber and a second effective piston surface adjacent to the accumulator region, wherein the piston is axially movable via a change in pressure of the accumulator region of the valve chamber; at least two sealing elements arranged in the valve chamber and which are configured to guide in an axially movable manner the piston; and at least one spring, wherein: a sealing body of the at least two sealing elements or the valve housing form a valve seat, a passage opening arranged between the intake opening and the outlet opening is reversibly closed and opened via a change in pressure of the accumulator region of the valve chamber, and in a unpressurized state, the passage opening is kept open by the at least one spring, and the accumulator region of the valve chamber is configured for connection to the inlet region of the valve chamber.

In accordance with embodiments, a system includes at least one of the following: a pressure accumulator vessel; and a pressure shut-off valve unit operatively connected to the pressure accumulator vessel and which includes a valve housing having a valve chamber with an accumulator region, an intake opening and an outlet opening facing the pressure accumulator vessel; a piston having at least one axial connecting channel, a first effective piston surface facing an inlet region of the valve chamber and a second effective piston surface adjacent to the accumulator region, the piston configured for axially movement due to a change in pressure of the accumulator region; sealing elements arranged in the valve chamber and which are configured to guide the piston in an axially movable manner; and a bias mechanism, wherein: a passage opening arranged between the intake opening and the outlet opening is reversibly closed and opened via the change in pressure of the accumulator region of the valve chamber, and in a unpressurized state, the passage opening is kept open by the bias mechanism, and the accumulator region of the valve chamber is configured for connection to the inlet region of the valve chamber.

The result is a purely mechanical pressure shut-off valve unit which, owing to an adjusted spring force, tightly closes the passage opening from a certain pressure and does not open either upon a further increase in pressure or reduction in pressure to negative pressure in the intake opening, and therefore, always remains closed.

Medium is removed from the pressure accumulator vessel via a removal channel and a removal valve which is arranged so as to be connectable to an inlet region, or else at one or more other locations in the pressure accumulator system.

During the filling operation, the inventive advantage of the mechanical pressure shut-off valve unit is that a pressure accumulator system connected downstream reaches only the pressure which is desired and the pressure shut-off valve unit always remains securely closed irrespective of the pressure upstream of the pressure shut-off valve unit and without an electric actuator and therefore reliably maintains the pressure in the pressure accumulator system connected downstream and does not permit a further increase in pressure due to medium flowing in after. A further advantage of this valve design resides in the fact that, although in the event of leakages at the sealing seat between piston and sealing body, the pressure accumulator system which is connected downstream may be exposed to an undesirable increase in pressure, the contact pressure force of the piston against the sealing body increases with an increase in the pressure on the outlet side and therefore the leak is reduced again.

It is particularly advantageous that, in the unpressurized state, the passage opening is kept open by the force of the biasing mechanism. The medium may therefore flow unobstructed into the pressure accumulator vessel until the end phase of the replenishing operation and harmful vibrations in the region of the valve chamber are avoided.

If the pressure in the intake opening drops below the pressure in the accumulator region, the removal valve may be opened and medium flows from the accumulator region through the removal channel to the intake opening. Medium may thereby be removed from the pressure accumulator vessel or system connected downstream via the supply line. This makes it easier to use additional pressure accumulator vessels and considerably simplifies the pipework of pressure accumulator systems.

The pressure shut-off valve unit in accordance with embodiments is particularly suitable for different fluid media, such as hydrogen, methane, natural gas or a mixture of hydrogen and natural gas. By way of appropriate modifications, use with liquid gas (LPG) and other liquid media is also possible.

In accordance with embodiments, a pressure accumulator system includes at least one pressure accumulator vessel and at least one pressure shut-off valve unit which is operatively connected thereto.

By using the pressure shut-off valve unit in accordance with embodiments, by itself and also in combination with electric valves, a plurality of pressure accumulator vessels having a different permissible operating pressure may be connected in such a manner that those pressure accumulator vessels which have a lower permissible operating pressure than a customary or (higher) filling pressure provided for the entire system have, connected upstream, a pressure shut-off valve unit which is coordinated with the respective permissible operating pressure of the respective pressure accumulator vessel in order to protect the respective pressure accumulator vessel from over-replenishment.

This advantageously serves to increase the reliability against overfilling during refueling and permits the use of more cost-effective pressure accumulator vessels having lower permissible pressure levels. However, it is thereby also possible for an existing system greatly to increase the storage capacity of an existing pressure accumulator system in a cost-effective manner by way of an additional system and higher pressure level.

In accordance with embodiments, the removal valve may be designed as a spherical or conical valve and, in an unpressurized state, is kept closed by an adjustment bias mechanism such as, for example, a spring, wherein the adjustment spring is arranged on that side of the removal valve which faces the inlet region. As a result, in the event of positive pressure in the intake opening and also when there is no pressure, the spherical valve is permanently closed by the adjustment spring. If the pressure in the intake opening drops below the pressure in the accumulator region, the spherical valve may open, in accordance with the spring force of the adjustment spring, and medium flows from the accumulator region through the removal channel back to the intake opening.

In accordance with embodiments, in the pressure shut-off valve unit, the spring force of the adjustment spring may be adjustable via a spring-fixing screw. The advantage of this arrangement resides in the fact that, by way of the possibility of adjustment of the spring force, the spherical valve opens again at any value below the shut-off pressure of the pressure shut-off valve unit. However, the time and the pressure level in the accumulator region of the valve chamber, from which the pressure shut-off valve unit opens, may therefore also adjustable.

In accordance with embodiments, in the pressure shut-off valve unit, the spring-fixing screw may be arranged coaxially with the adjustment spring and has an axial channel which is designed as a throttle. This permits a damped connection of medium from the accumulator region of the valve chamber through the throttle point in the channel of the spring-fixing screw to the intake opening and therefore a slow dissipation of pressure in the accumulator region. Pressure peaks in the region of the intake opening are avoided.

In accordance with embodiments, the removal channel and the removal valve may be arranged integrated in the valve housing.

In accordance with embodiments, the removal channel and the removal valve may be arranged integrated in the piston. This permits a space-saving construction and the production and the assembly and also the installation of the pressure shut-off valve unit in pressure accumulator systems are simplified.

In accordance with embodiments, the first effective piston surface and the sealing body or the valve housing may be designed in such a manner that, in a closed position of the piston, a sealing effect occurs at a sealing edge in the region of the outer border of the first effective piston surface.

In accordance with embodiments, outer border here means lying radially on the outside, as viewed from the axis of the piston. The outer border of the piston may be obliquely bevelled or rounded, for example, in the region of the first effective piston surface. The first effective piston surface may also have a raised bead on the outer border in order to localize the sealing effect in this region.

In accordance with embodiments, when a specified or predetermined shut-off pressure is exceeded or when a detected pressure exceeds the shut-off pressure, force is no longer exerted on the piston counter to the closing direction of the piston. The shut-off pressure and the closing behaviour of the pressure shut-off valve unit in accordance with embodiments are therefore independent of the pressure in the intake opening. In addition, when the valve is closed, axial force may not be exerted on the piston by the pressure in the intake opening even if there is a rise in pressure in the intake opening and the pressure shut-off valve unit remains securely closed even in the event of extreme pressure surges.

In accordance with embodiments, it is also ensured that the pressure shut-off valve unit remains closed even if the pressure in the intake opening drops below the shut-off pressure at which the piston has previously closed, since the closing force then continuing is substantially determined only by the pressure in the accumulator region of the valve chamber on the effective piston surface minus the spring force of the spring.

Owing to the fact that the intake opening opens radially outside the effective piston surface into the inlet region of the valve chamber, it is additionally ensured that an axial force cannot not be exerted on the piston by the pressure in the intake opening.

In accordance with embodiments, the second effective piston surface may have a greater surface area than the surface area of the first effective piston surface. A relatively larger second effective piston surface makes it possible to realize smaller valves for the shut-off pressure of the pressure shut-off valve unit.

In accordance with embodiments, the piston may have a cylindrical cross section and the outer side thereof may have sliding surfaces in at least two regions having different diameters.

In accordance with embodiments, the at least two sealing elements may be arranged in corresponding clearances in the valve housing. The most cost-effective alternative would be to accommodate the sealing elements in one groove each in the piston. Sealing elements arranged in grooves on the piston prove problematic at very high pressures (200 to 1000 bar). Depending on the pressure, a variable force is exerted on the piston, and therefore, influences the shut-off pressure of the pressure shut-off valve unit. By way of the arrangement of the seals in clearances or grooves in the valve housing, in particular in cylindrical sections of the valve chamber, the piston is not subjected to a variable action of force by the pressure of the medium and the pressure shut-off valve unit remains reliably closed.

In accordance with embodiments, the sealing body and/or the piston may be produced from an elastically deformable material. By way of a selection of material adapted to the very high pressures (200 to 1000 bar), the sealing effect is optimized and wear at the valve seat avoided. Particularly suitable materials may include plastics, such as PEEK and PAS, or ceramic materials, such as aluminium oxide and silicon carbide, but also special steels and other metals. The pressure shut-off valve unit does not have to have a separate sealing body. It is also possible for the piston to be sealed directly against the valve housing. Preferred combinations of material are familiar to a person skilled in the art.

In accordance with embodiments, a relief region of the valve chamber, which relief region is arranged between the inlet region and the accumulator region of the valve chamber, has a relief opening between the at least two sealing elements. As a result, medium emerging in the event of leakages at one of the sealing elements cannot result in an increase in pressure in the other region in each case of the valve chamber. Furthermore, the relief region ensures that pressure is equalized when the piston is displaced, thus enabling rapid piston movements and therefore short reaction times of the valve.

In accordance with embodiments, the relief opening may be operatively connected to a line for disposing of emerging medium. By this device (combustible) medium which may emerge is transported away from the immediate vicinity of the pressure shut-off valve unit and is treated further at low pressure at a suitable location without risk to vehicle occupants.

In accordance with embodiments, the shut-off pressure of the pressure shut-off valve unit is substantially determined by the spring force of the spring and the effective piston surfaces. The spring force of the spring is dimensioned in coordination with the effective piston surfaces in such a manner that, as the pressure in the accumulator region rises, the pressure shut-off valve unit reliably closes and remains closed after a predetermined shut-off pressure has been exceeded. The friction at the sealing elements is also important in the dimensioning of the spring force.

In accordance with embodiments, the spring force of the spring may be adjustable via the screw-in depth of a cover. By this device, for example, during assembly, tolerances of the spring force and/or differences in the friction between piston and sealing elements, for example, caused by manufacturing tolerances, may be compensated for.

In accordance with embodiments, spacers are provided on and/or over the cover of the valve housing while corresponding recesses are provided on the second effective piston surface of the piston. This achieves a good distribution of pressure to the second effective piston surface of the piston. This accelerates the closing of the piston even in the event of a very small difference in pressure between the effective piston surfaces.

It is also advantageous if the valve housing at least partially projects at the end having the outlet opening into an opening in the pressure accumulator vessel, and thus, is permanently operatively connected to the pressure accumulator vessel. In this way, the pressure shut-off valve unit may be arranged in the interior of a pressure accumulator vessel in a space-saving manner and protected from mechanical action of force. Alternatively, the outlet opening may be permanently connected to the pressure accumulator vessel via a pressure line. The fitted position of the pressure shut-off valve unit, for example in a tank neck, is thereby largely independent of the fitted position of the pressure accumulator vessel.

In accordance with embodiments, in the pressure shut-off valve unit, the outlet opening may be arranged so as to be connectable to the pressure accumulator vessel via a valve-receiving block or via an accumulator valve block having at least one additional valve. Accumulator valve blocks are known and are structural units which combine a plurality of valve functions in a compact housing and are fixedly connectable to an opening in a pressure accumulator vessel. The shut-off function, which serves to protect against overfilling, of the pressure shut-off valve unit may thereby be expanded by further functions in a modular and space-saving manner.

In accordance with embodiments, in the pressure shut-off valve unit, a pressure control valve, the opening pressure of which lies above the shut-off pressure of the pressure shut-off valve, is arranged between the accumulator region and the relief region of the valve chamber.

In accordance with embodiments, the pressure control valve may be arranged integrated in the piston. This increases the operating reliability of the pressure accumulator system. Since the pressure shut-off valve unit does remain closed, without a pressure control valve of this type overheating of the medium caused, for example, by a fire and a resulting rise in pressure in the pressure accumulator vessel would mean destruction of the pressure accumulator vessel. A combination of pressure shut-off valve unit and pressure control valve in a common valve housing may also be used.

DRAWINGS

Embodiments will be illustrated by way of example in the drawings and explained in the description below.

DESCRIPTION

Figure 1:
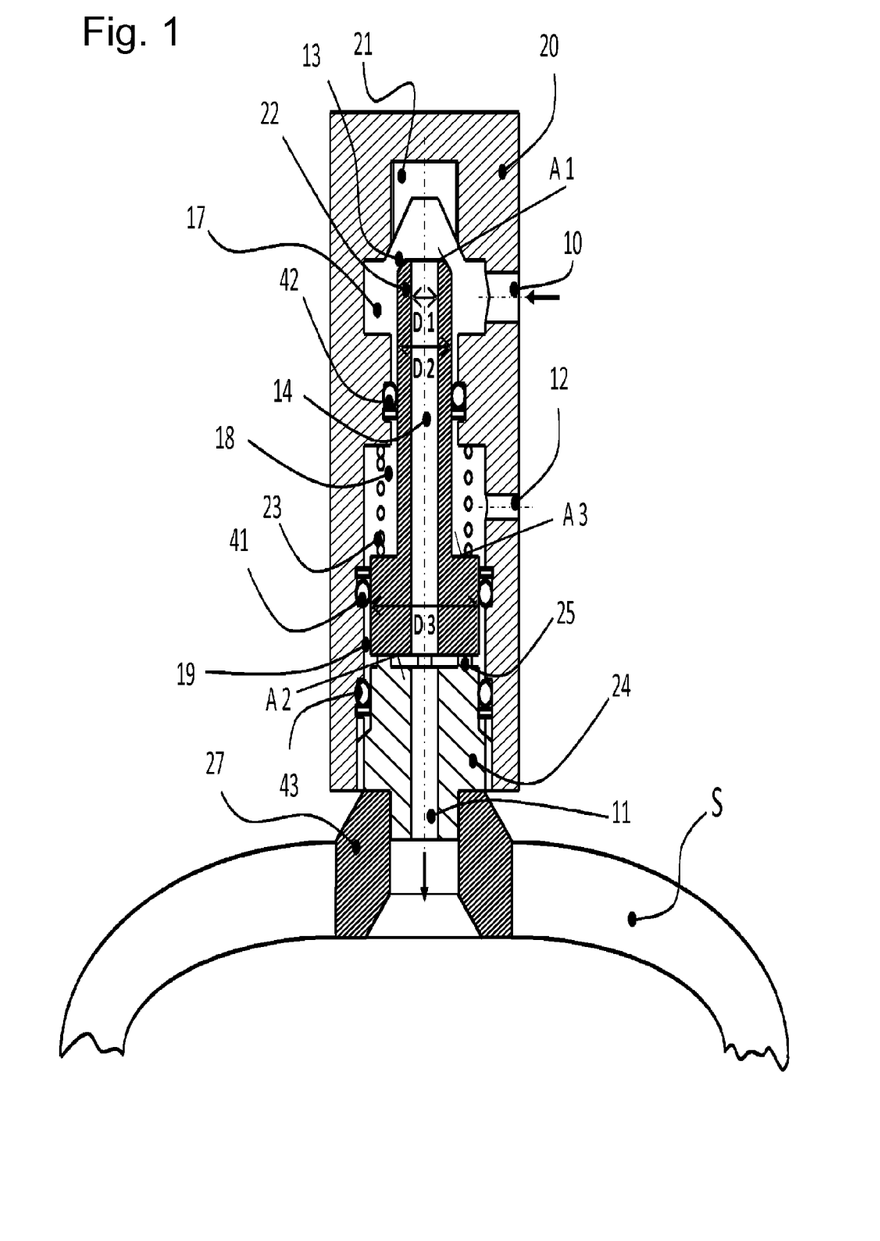
FIG. 1 illustrates a sectional view of an embodiment of a shut-off valve in accordance with embodiments.

As illustrated in FIG. 1, a shut-off valve is arranged in accordance with embodiments in an opening in a pressure accumulator vessel S via a valve-receiving block 27. "Shut-off valve" here denotes the entirety of those parts of the pressure shut-off valve unit in accordance with embodiments that control a filling operation. A piston 22 having two sections with different outside diameters D2, D3 and a connecting channel 14, which is designed as a central hollow bore and has the inside diameter D1, is mounted in a valve housing 20. The piston 22 is supported at the transition to the larger outside diameter D3 via the support A3 by a bias mechanism such as, for example, a spring 23 spatially on and/or over the valve housing 20, as a result of which the piston 22 is kept in contact with the cover 24 and the passage opening 13 is thereby kept in an open position in an unpressurized fitted state.

The piston 22 is sealed by sealing elements 41, 42 in the two sections with different outside diameters D2, D3 in such a manner that the space with the spring 23 between the seal elements 41, 42 may breathe freely through a ventilation opening 12 to the atmospheric pressure. The sealing elements 41, 42 may be fitted either in the piston 22 or, as illustrated, in the valve housing 20. The seal 43 seals off the adjustable cover 24 from the valve housing 20.

During a filling operation, for example, of a pressure accumulator vessel arranged at the outlet opening 11, a fluid medium may pass through the intake opening 10 in the inlet region 17 of the valve chamber via the passage opening 13 and through the connecting channel 14 into the accumulator region 19 of the valve chamber and, in consequence, through the outlet opening 11 into the following pressure accumulator vessel S. If the pressure in the entire pressure accumulator system rises to such an extent that, because of the force ratios due to the pressure prevailing at the effective piston surfaces A2 and A1, the piston 22 overcomes the spring force of the spring 23, the piston 22 is raised and pushed against the sealing body 21. As soon as the piston is raised, the piston contact surfaces which are initially covered by the spacers 25 are then additionally pressurized, as a result of which a greater force acts on the piston and therefore the shut-off valve closes in an accelerated manner. This pressure corresponds to the shut-off pressure.

In order not to obtain any further pressure force on the piston, it is therefore advantageous if the piston is sealed off on the outer diameter D2 with respect to the sealing body 21. In the event of a rise in pressure in the inlet region 17, the shut-off valve continues to remain closed since the increase in pressure no longer acts on the first effective piston surface A1. If the pressure in the inlet opening 10 drops below the pressure at which the piston has closed, the valve nevertheless remains closed, since the closing force is determined by the pressure in the outlet opening 11 on the effective piston surface A2, minus the spring force of the spring 23, and this state has not changed. It is therefore possible to apply negative pressure on the inlet side 10 without the valve opening as a result. The spring force of the spring 23 is additionally adjustable by the screw-in depth of the cover 24.

In order to obtain a good distribution of pressure to the second effective piston surface A2, either spacers 25 should be provided on the cover 24 or corresponding recesses should be provided on the piston.

Figure 2:
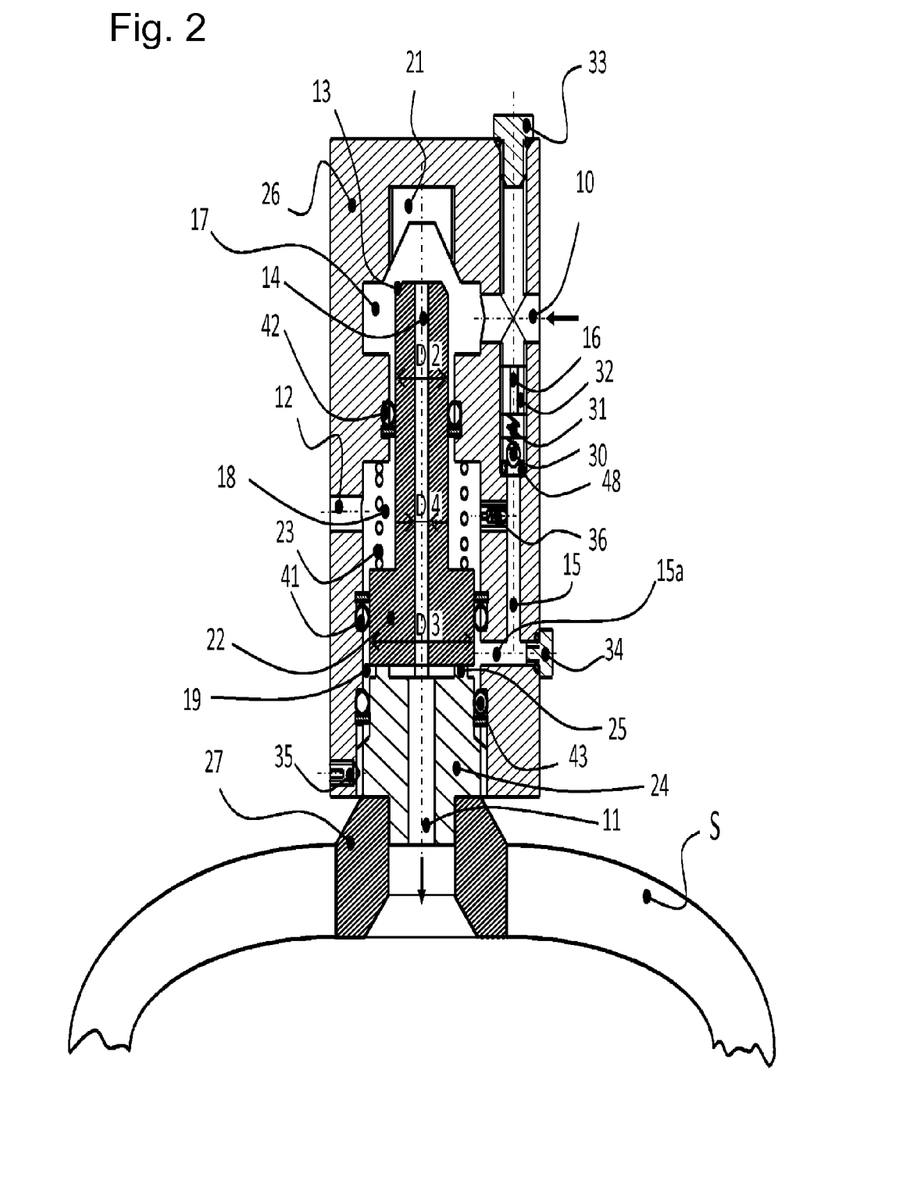
FIG. 2 illustrates a sectional view of a pressure shut-off valve unit in accordance with embodiments, the sectional view illustrating the shut-off valve of FIG. 1 with additional valves fitted.

FIG. 2 illustrates by way of example a complete pressure shut-off valve unit in accordance with embodiments. The pressure shut-off valve unit may include all of the components of the shut-off valve illustrated in FIG. 1, with essentially the same reference signs. The changed valve housing 26 has a removal channel 15 which is illustrated by way of example between the accumulator region 19 and the intake opening 10 and in which a removal valve 30 which opens and closes in accordance with the pressure ratios is arranged.

Advantageously, the removal of valve 30 as a mechanical spherical valve, in which the spherical valve is permanently closed in an unpressurized state by a spring 31. If the pressure in the intake opening 10 drops below the pressure in the accumulator region 19 and therefore in the removal channel 15, 15a, the spherical valve may open depending on the spring force of the adjustment spring 31, and medium flows from the accumulator region 19 through the removal channel 15 and the channel 16 in the spring-fixing screw 32 back again to the intake opening 10. Only by this device may medium be removed from the pressure accumulator system connected downstream, provided that the pressure accumulator system connected downstream does not have any further removal devices.

The pressure in the accumulator region 19 is subsequently dissipated and, depending on the hysteresis of the spring 23 and the friction of the sealing elements 41, 42, the piston 22 of the shut-off valve is pressed downwards with a time delay and the passage opening 13 is opened up. As a result, in addition to the flow through the removal valve 30, medium may flow back from the accumulator region 19 through the connecting channel 14, which has a diameter D4, to the intake opening 10. Pressure is thereby equalized again between the accumulator region 19 of the valve chamber and the intake opening 10 and the removal valve 30 closes again because of the spring force of the adjustment spring 31. The mass intake flow may be coordinated by the bore diameter D4 in accordance with the respective requirements.

The seal 48 is configured to seal a removal valve 30, which is screwed in as an assembly, in relation to the valve body 26. The removal valve 30 may also be used in combination with electric valves or a mechanically adjustable valve for controlling the time of the opening of the pressure shut-off valve unit as desired.

The securing of the screwed-in cover 24, and therefore, the reliable establishing of the shut-off pressure may be achieved as technically customary, for example, with a clamping screw 35. Necessary bores may be sealed off to the outside, likewise as technically customary, by way of screws with sealing rings 33 and 34.

Provided in accordance with embodiments is a combination of pressure shut-off valve unit with a pressure control valve 36 in a common valve housing 26 between the line on the removal channel 15 and the relief region 18 which serves as space for the spring 23 and has relief opening 12. The reliable transportation away of escaping medium eliminates any further factor critical to safety.

The shut-off valve opens only if the pressure in the outlet opening 11 drops as a result of the fact that medium is removed in the following system via a separate location and, as a result, the pressure drops below the shut-off pressure. The shut-off valve opens either by the pressure in the accumulator region 19 dropping below the closing pressure of the shut-off valve because of removal of pressure from the pressure accumulator vessel by the consumer, or by way of the removal valve 30 which is illustrated in FIG. 2 and is arranged in the removal channel 15, 15a.

Figure 3:
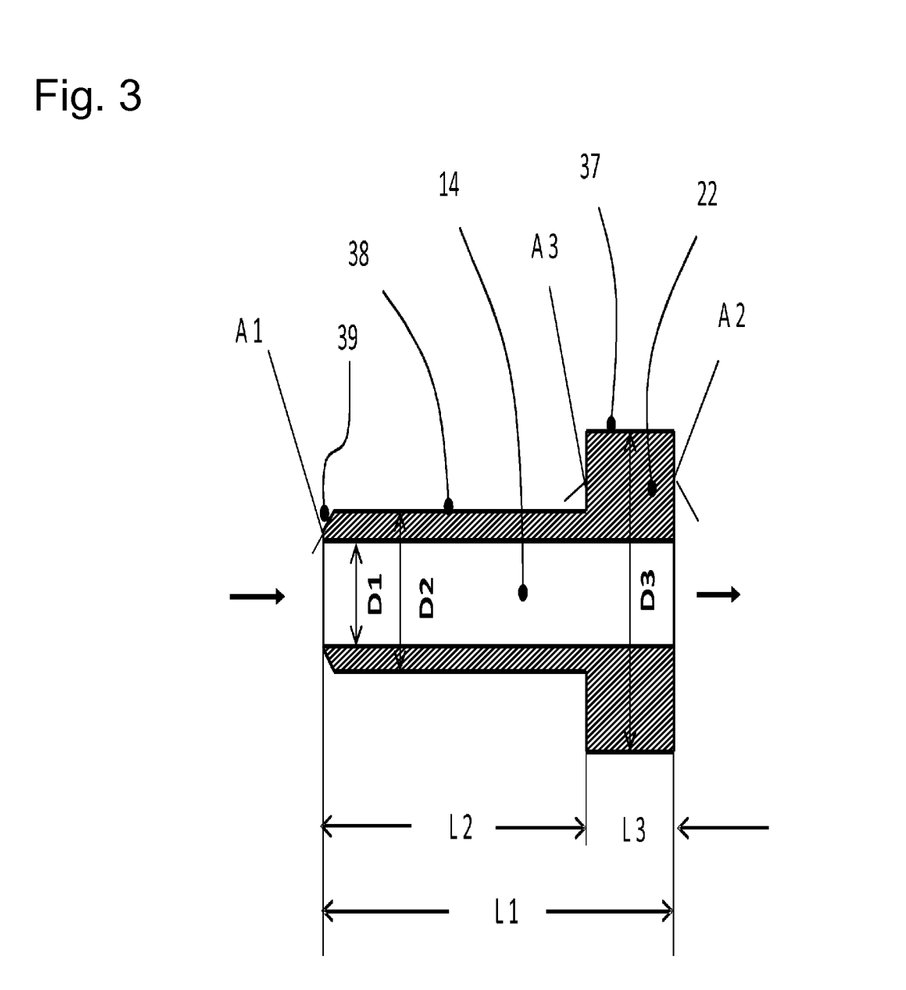
FIG. 3 illustrates a sectional view of a piston for a pressure shut-off valve unit in accordance with embodiments.

FIG. 3 illustrates a piston 22 of the pressure shut-off valve unit in accordance with embodiments in detail by way of example. In the embodiment illustrated, the cylindrical piston with the overall length L1 has two sections having different outside diameters D2 and D3. A first piston section has a first effective piston surface A1 formed normally to the axis of the piston 22, a sealing edge 39 formed as a bevel on an edge of the piston, and a first sliding surface 38 with the length L3 and an outside diameter D2. A second piston section has a second effective piston surface A2, a support A3 for the spring 23 and a second sliding surface 37 with the length L3 and an outside diameter D3. The connecting channel 14 is deigned as an axial bore over the entire length L1 of the piston 22 and has an inside diameter D1. The connecting channel 14 connects the two effective piston surfaces A1, A2 and, corresponding to the embodiment of the valve housing 20 and the operating state of the pressure shut-off valve unit, medium flows through the connecting channel.

Figure 4:
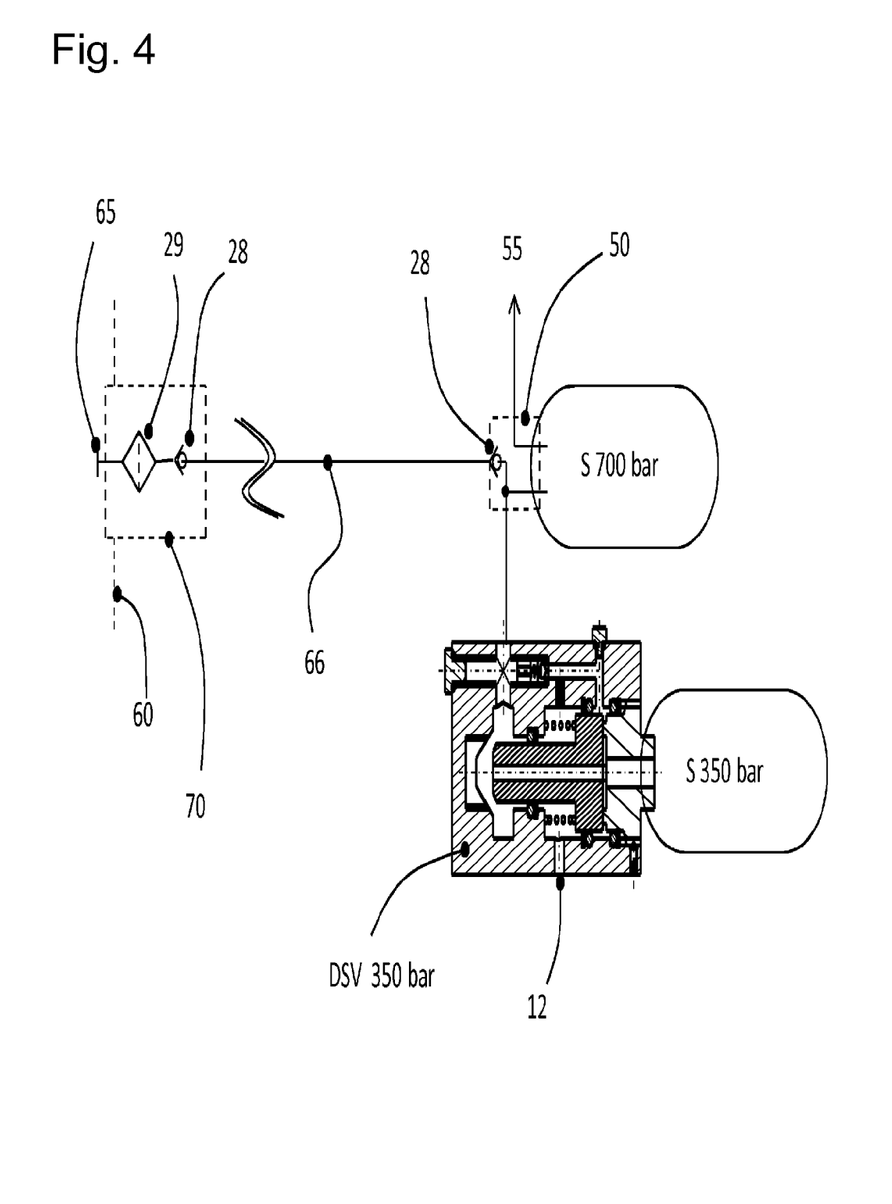
FIG. 4 illustrates a schematic illustration of a device for replenishing a motor vehicle at a filling station having a dispensing pressure of 700 bar, containing a system of two pressure vessels having different permissible operating pressure.

FIG. 4 illustrates by way of example a pressure accumulator system in which the pressure line 66 leads from the tank neck unit 70 to an accumulator valve block 50 of a first pressure accumulator vessel S (permissible operating pressure 700 bar) without branching. A further pressure line leads from the one inlet region of the accumulator valve block 50 to a secondary, second pressure accumulator vessel S (permissible operating pressure 350 bar), wherein the pressure shut-off valve unit DSV in accordance with the subject matter of embodiments and having an integrated removal valve protects the pressure accumulator system by the pressure shut-off valve unit DSV closing when the preset shut-off pressure of 350 bar is reached.

The pressure shut-off valve unit DSV opens only when the pressure in the first pressure accumulator vessel and therefore also in the connecting line between the pressure accumulator vessels drops under the shut-off pressure (350 bar) of the pressure shut-off valve unit DSV by removal of medium. The pressure accumulator system is emptied by a pressure regulator integrated in the accumulator valve block 50 and by a pressure line 55 to a consumer. The pressure accumulator system illustrated in FIG. 4 has a very small number of separate components and simple topology of the pressure lines.

Figure 5:
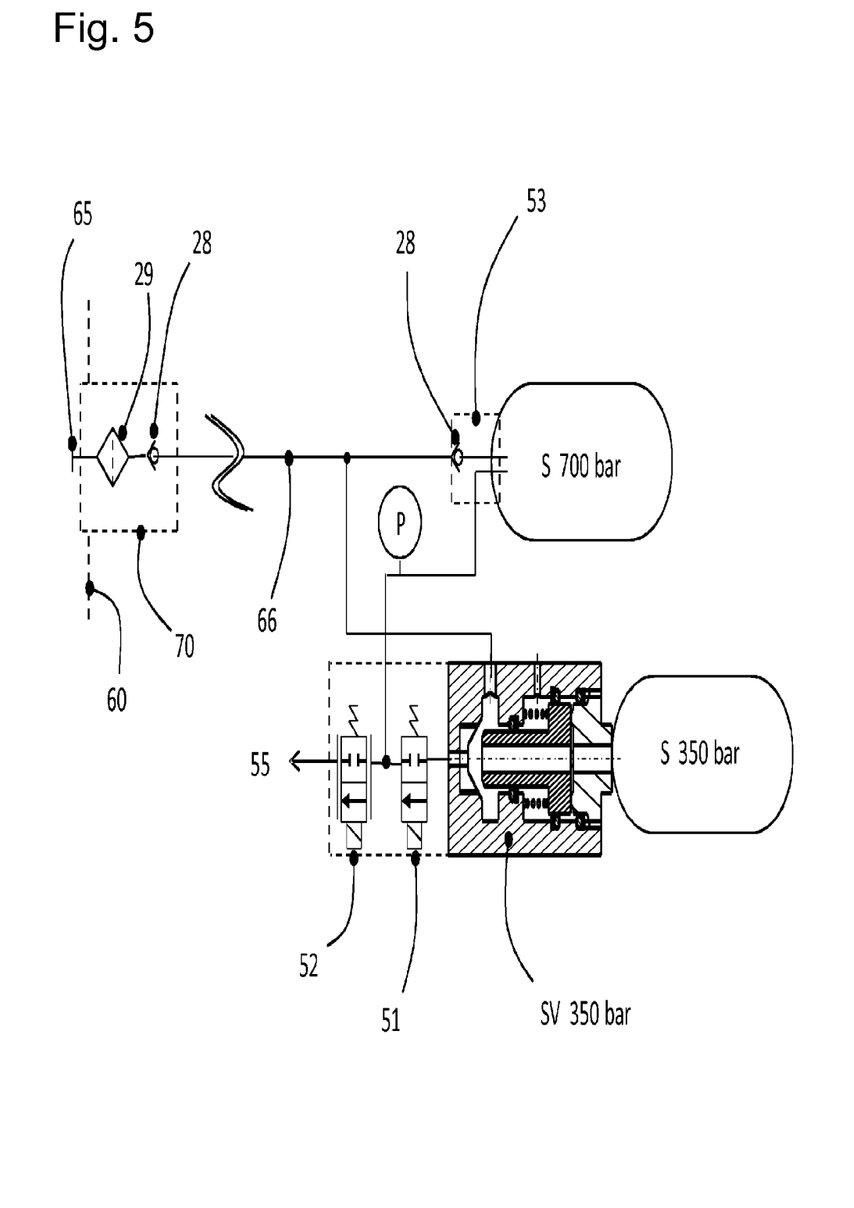
FIG. 5 illustrates a schematic illustration of a device for replenishing a motor vehicle at a filling station having a dispensing pressure of 700 bar, containing a pressure accumulator system with two pressure vessels having different permissible operating pressure.

FIG. 5 illustrates by way of example a pressure accumulator system comprising a combination of a shut-off valve SV with electrically actuable valves in an application with a parallel arrangement of two pressure accumulator vessels S having different permissible operating pressures. The tank connecting unit 70 (corresponding to the prior art) is fitted in a body 60 of a motor vehicle and has a tank neck 65. During the filling operation, the medium flows through a filter 29 and a nonreturn valve 28 into the branched pressure line 66.

One branch of the pressure line 66 leads via a first accumulator valve block 53 with a fitted safety valve and nonreturn valve 28 into the first pressure accumulator vessel S having a permissible filling pressure of 700 bar. In order to remove medium, the first accumulator valve block 53 additionally has a removal line, the removal line leading to a pressure regulator 52. The other branch leads into an inlet opening 10, which is arranged radially here, in a shut-off valve SV which is configured for a shut-off pressure of 350 bar and is directly connected by the outlet opening 11 thereof to a second pressure accumulator vessel S having a permissible filling pressure of 350 bar.

The shut-off valve SV illustrated in FIG. 5 may additionally include, in the region of the sealing body, an opening which is connected to an electrically actuable safety valve 51. The electrically actuable safety valve 51 here is a solenoid valve which may be opened and closed electrically. A pressure regulator 52 is connected downstream of the electrically actuable safety valve 51. The connecting line coming from the first pressure accumulator vessel S opens into the connecting line between the electrically actuable safety valve 51 and the pressure regulator 52. The first connecting line has a pressure sensor P. The electrically actuable safety valve 51 permits removal of medium from the second pressure accumulator vessel S with a permissible filling pressure of 350 bar as soon as the pressure in the connecting line has dropped under the shut-off pressure of the shut-off valve SV.

A further alternative (not illustrated), of a shut-off valve SV in accordance with embodiments provides a variation in the embodiment illustrated in FIG. 1. The outlet opening 11 which, in FIG. 1, is arranged in the cover 24 is placed into the valve housing 20 under the sealing body 23 in alignment with the axis of movement of the piston 22. The cover 24 then tightly closes off the valve chamber, not including the outlet opening. By way of an axial bore in the sealing body 23, which axial bore is aligned with the new outlet opening in the valve housing 20, medium may flow, when the valve seat is open, through the passage opening 13 and the axial bore in the sealing body 23 and through the new outlet opening, which is aligned with the axis of movement of the piston 22, into a pressure accumulator vessel S which is fixedly connected to the outlet opening.

The connecting channel 14 which is likewise aligned with the axis of movement of the piston 22 enables pneumatic or hydraulic communication of the medium with the second effective piston surface A2 and brings about closing of the shut-off valve when the predetermined shut-off pressure is reached. This alternative construction of the shut-off valve in accordance with embodiments may be formed in a particularly space-saving manner. Given a suitable configuration of a removal channel and a removal valve, the alternative construction is suitable for design as the pressure shut-off valve unit in accordance with FIG. 2.

In all of the embodiments in which a sealing body 21 is used, the sealing body 21 has to be sealed off from the valve housing 20 for safety reasons so that no additional forces may arise and act on the sealing edge of the sealing body.

Embodiments is suitable both for pressure accumulator systems operated in stationary form and for pressure accumulator systems in vehicles. In accordance with embodiments, the designation of vehicle includes, for example, motor vehicles, rail vehicles, and also watercraft and aircraft. All of the pressure values stated are by way of example and do not in any way limit embodiments and the pressure range for which embodiments is claimed.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

10 Intake opening
11 Outlet opening
12 Relief opening
13 Passage opening
14 Connecting channel
15, 15a Removal channel
16 Channel
17 Valve chamber, inlet region
18 Valve chamber, relief region
19 Valve chamber, accumulator region
20 Valve housing
21 Sealing body
22 Piston
23 Spring
24 Cover
25 Spacer
26 Valve housing
27 Valve-receiving block
28 Non-return valve
29 Filter
30 Removal valve
31 Adjustment spring
32 Spring-fixing screw
33, 34 Closure elements
35 Clamping screw
36 Pressure control valve
37, 38 Sliding surfaces
39 Sealing edge
41, 42, 43 Sealing elements
48 Seal
50 Accumulator valve block with pressure regulator
51 Electric safety valve
52 Pressure regulator
53 Accumulator valve block with safety valve
55 Pressure line to the consumer
60 Motor vehicle body
65 Tank neck
66, 67 Pressure line
70 Tank neck unit
A1, A2 First and second effective piston surfaces
A3 Support
D1, D4 Inside diameter, connecting channel
D2, D3 Outside diameter, piston subsections
DSV Pressure shut-off valve unit
L1 Overall length of the piston
L2, L3 Length of the piston subsections
P Pressure sensor
S Pressure accumulator vessel
SV Shut-off valve

What is claimed is:

1. A pressure shut-off valve unit for a pressure accumulator vessel, comprising:
   a valve housing having an intake opening, an outlet opening facing the pressure accumulator vessel, and a valve chamber with an inlet region, and an accumulator region for connection to the inlet region via a removal channel and a removal valve;
   a piston having at least one axial connecting channel, a first effective piston surface facing the inlet region of the valve chamber, and a second effective piston surface adjacent to the accumulator region, wherein the piston is axially movable via a change in pressure of the accumulator region of the valve chamber; and sealing elements arranged in the valve chamber and which are configured to guide the piston in an axially movable manner;

a sealing body that forms a valve seat;

at least one spring; and a passage opening arranged between the intake opening and the outlet opening, and which is reversibly closed and opened via a change in pressure of the accumulator region of the valve chamber, and in a unpressurized state, is kept open by the at least one spring.

2. The pressure shut-off valve unit of claim 1, further comprising:

an adjustment spring arranged on a side of the removal valve which faces the inlet region, and which is to keep the removal valve, in an unpressurized state, closed; and a spring-fixing screw to adjust a spring force of the adjustment spring.

3. The pressure shut-off valve unit of claim 2, wherein the spring-fixing screw is arranged coaxially with the adjustment spring and has an axial channel comprising a throttle.

4. The pressure shut-off valve unit of claim 1, wherein the removal channel and the removal valve are arranged integrated in the valve housing.

5. The pressure shut-off valve unit of claim 1, wherein the first effective piston surface is structured such that, in a closed position of the piston, a sealing effect occurs at a sealing edge of the piston in a region of the outer border of the first effective piston surface.

6. The pressure shut-off valve unit of claim 1, further comprising a relief opening in the valve housing for connection to a line to dispose of an emerging medium.

7. The pressure shut-off valve unit of claim 1, wherein the intake opening opens radially outside one of the first effective piston surface and the second effective piston surface into the inlet region of the valve chamber.

8. The pressure shut-off valve unit of claim 1, wherein the second effective piston surface is greater than the first effective piston surface.

9. The pressure shut-off valve unit of claim 1, wherein the sealing body is elastically deformable.

10. The pressure shut-off valve unit of claim 1, wherein the piston is elastically deformable.

11. The pressure shut-off valve unit of claim 1, further comprising a relief region of the valve chamber having a relief opening arranged between the sealing elements.

12. The pressure shut-off valve unit of claim 1, wherein a shut-off pressure of the pressure shut-off valve unit corresponds to the spring force of the spring, the first effective piston surface and the second effective piston surface.

13. The pressure shut-off valve unit of claim 1, further comprising a cover to adjust the spring force of the spring via a screw-in depth thereof.

14. The pressure shut-off valve unit of claim 13, further comprising a spacer provided on the cover.

15. The pressure shut-off valve unit of claim 1, wherein the valve housing at least partially projects at an end having the outlet opening into an opening of the pressure accumulator vessel and is configured for permanent connection to the pressure accumulator vessel.

16. The pressure shut-off valve unit of claim 1, further comprising a valve-receiving block to connect the outlet opening to the pressure accumulator vessel.

17. The pressure shut-off valve unit of claim 1, further comprising an accumulator valve block having at least one additional valve to connect the outlet opening to the pressure accumulator vessel.

18. The pressure shut-off valve unit of claim 1, further comprising a pressure control valve arranged between the outlet region and a relief region, the pressure control valve having an opening pressure which is above a shut-off pressure of the pressure shut-off valve.

19. A pressure accumulator system, comprising:

a pressure accumulator vessel; and a pressure shut-off valve unit operatively connected to the pressure accumulator vessel, the pressure shut-off valve unit including:

a valve housing having a valve chamber with an inlet region, an accumulator region for connection to the inlet region via a removal channel, a relief region having a relief opening, an intake opening and an outlet opening facing the pressure accumulator vessel;

a piston axially movable via a change in pressure of the accumulator region of the valve chamber, the piston having a first effective piston surface facing the inlet region of the valve chamber, and a second effective piston surface adjacent to the accumulator region;

a sealing body that forms a valve seat; and a pressure control valve arranged between the outlet region and the relief region, the pressure control valve having an opening pressure which is greater than a shut-off pressure of the pressure shut-off valve.

20. A pressure accumulator system, comprising:

a pressure accumulator vessel; and a pressure shut-off valve unit operatively connected to the pressure accumulator vessel and which includes:

a valve housing having a valve chamber with an inlet region, an accumulator region for connection to the inlet region via a removal channel, a removal valve which, in an unpressurized state, is kept closed by an adjustment spring arranged on a side of the removal valve which faces the inlet region, an intake opening and an outlet opening facing the pressure accumulator vessel;

a piston axially movable via a change in pressure of the accumulator region of the valve chamber, the piston having a first effective piston surface facing the inlet region of the valve chamber, and a second effective piston surface adjacent to the accumulator region;

a sealing body that forms a valve seat; and a spring-fixing screw to adjust a spring force of the adjustment spring.

\* \* \* \* \*